United States Patent
Kim et al.

(10) Patent No.: US 8,412,275 B2
(45) Date of Patent: Apr. 2, 2013

(54) METHOD AND SYSTEM FOR COMMUNICATING FEEDBACK INFORMATION IN A MULTIPLE USER MULTIPLE INPUT MULTIPLE OUTPUT (MU-MIMO) COMMUNICATION SYSTEM

(75) Inventors: Joonsuk Kim, Saratoga, CA (US); Sirikiat Ariyavisitakul, Alpharetta, GA (US)

(73) Assignee: Broadcom Corporation, Irvine, CA (US)

( * ) Notice: Subject to any disclaimer, the term of this patent is extended or adjusted under 35 U.S.C. 154(b) by 447 days.

(21) Appl. No.: 12/720,937

(22) Filed: Mar. 10, 2010

(65) Prior Publication Data
US 2011/0159866 A1 Jun. 30, 2011

Related U.S. Application Data

(60) Provisional application No. 61/291,355, filed on Dec. 30, 2009.

(51) Int. Cl.
H04M 1/00 (2006.01)
H04B 17/00 (2006.01)
(52) U.S. Cl. ............... 455/562.1; 455/561; 455/67.11; 370/252
(58) Field of Classification Search .................. None
See application file for complete search history.

(56) References Cited

U.S. PATENT DOCUMENTS

2008/0305745 A1* 12/2008 Zhang et al. ............... 455/67.11
2010/0113078 A1* 5/2010 Farajidana et al. ........... 455/507
2011/0134771 A1* 6/2011 Chen et al. ................... 370/252

OTHER PUBLICATIONS

IEEE P802.11n/D11.0, Jun. 2009, "Draft Standard for Information Technology—Telecommunications and Information Exchange Between Systems—Local and Metropolitan Area Networks—Specific Requirements Part 11: Wireless LAN Medium Access Control (MAC) and Physical Layer (PHY) Specification Amendment 5: Enhancements for Higher Throughput", pp. 45, 50-58, 88-89, 91-92.

* cited by examiner

Primary Examiner — Erika A Washington
(74) Attorney, Agent, or Firm — Garlick & Markison; Bruce E. Garlick; Shayne X. Short

(57) ABSTRACT

A method and system for communicating feedback information in a multiple user multiple input multiple output (MU-MIMO) communication system are presented. In one aspect of the method and system, a beamformer station may communicate a feedback information request to a plurality of beamformee stations. The feedback information request may request feedback data for a plurality of RF channel bands. The RF channel bands may form a multichannel. The beamformer may subsequently transmit a plurality of signals utilizing the RF channel bands within the multichannel. Each of the beamformees may receive the plurality of subsequently transmitted signals. A beamformee may generate the requested feedback data for each RF channel band within the multichannel. The beamformee may generate a beamforming report, which comprises the feedback data, which is generated across the plurality of RF channel bands in the multichannel. The beamformee may transmit the beamforming report to the beamformer.

20 Claims, 18 Drawing Sheets

| Order | Information |
|---|---|
| 1 | Category |
| 2 | Action |
| 3 | Cluster/Channel Control |
| 4 | MIMO Control for 1st Channel Band |
| 5 | Beamforming Report for 1st Channel Band |
| ... | ... |
| 2+2xNch | MIMO Control for Nchth Channel Band |
| 3+2xNch | Beamforming Report for Nchth Channel Band |

| Field | Size | Meaning |
|---|---|---|
| SNR in receive chain 1 | 8 bits | Average Signal to Noise Ratio in the STA sending the report for receive chain 1 |
| ... | ... | ... |
| SNR in receive chain Nr | 8 bits | Average Signal to Noise Ratio in the STA sending the report for receive chain Nr |
| CSI Matrix for carrier -x | 3+2× *Nb×Nc×Nr* bits | CSI Matrix |
| ... | ... | ... |
| CSI Matrix for carrier -1 | 3+2× *Nb×Nc×Nr* bits | CSI Matrix |
| CSI Matrix for carrier 1 | 3+2× *Nb×Nc×Nr* bits | CSI Matrix |
| ... | ... | ... |
| CSI Matrix for carrier x | 3+2× *Nb×Nc×Nr* bits | CSI Matrix |

* X is 28 for 20Mhz, 56 for 40Mhz and 112 for 80Mhz for example

Nb is the number of bits for each component in a computed channel estimate matrix H

FIG. 6

| Field | Size | Meaning |
|---|---|---|
| CSI Feedback Report for carrier -x | 8 x Nr + 3+2x Nb×Nc×Nr | CSI Feedback Report for carrier -X |
| ... | ... | ... |
| CSI Feedback Report for carrier -1 | 8 x Nr + 3+2x Nb×Nc×Nr | CSI Feedback Report for carrier -1 |
| CSI Feedback Report for carrier 1 | 8 x Nr + 3+2x Nb×Nc×Nr | CSI Feedback Report for carrier 1 |
| ... | ... | ... |
| CSI Feedback Report for carrier x | 8 x Nr + 3+2x Nb×Nc×Nr | CSI Feedback Report for carrier X |

* X is 28 for 20Mhz, 56 for 40Mhz and 112 for 80Mhz for example

CSI Feedback Report for carrier k

| Field | Size | Meaning |
|---|---|---|
| SNR in receive chain 1 | 8 bits | Signal to Noise Ratio in the STA sending the report for receive chain 1 for carrier k |
| ... | ... | |
| SNR in receive chain Nr | 8 bits | Signal to Noise Ratio in the STA sending the report for receive chain Nr for carrier k |
| CSI Feedback Matrix | 3+2× *Nb×Nc×Nr* | CSI Feedback Matrix for carrier k |

FIG. 8

| Field | Size | Meaning |
|---|---|---|
| SNR in space-time stream 1 | 8 bits | Average Signal to Noise Ratio in the STA sending the report for space-time stream 1 |
| ... | ... | ... |
| SNR in space-time stream Nc | 8 bits | Average Signal to Noise Ratio in the STA sending the report for space-time stream Nc |
| Beamforming Feedback Matrix V for carrier -x | 2× *Nb*×*Nc*×*Nr* bits | Beamforming Feedback Matrix V |
| ... | ... | ... |
| Beamforming Feedback Matrix V for carrier -1 | 2× *Nb*×*Nc*×*Nr* bits | Beamforming Feedback Matrix V |
| Beamforming Feedback Matrix V for carrier 1 | 2× *Nb*×*Nc*×*Nr* bits | Beamforming Feedback Matrix V |
| ... | ... | ... |
| Beamforming Feedback Matrix V for carrier x | 2× *Nb*×*Nc*×*Nr* bits | Beamforming Feedback Matrix V |

• X is 28 for 20Mhz, 56 for 40Mhz and 112 for 80Mhz for example
• Nb is the number of bits for each component of V

FIG. 9

| Field | Size | Meaning |
|---|---|---|
| Beamforming Feedback Report for carrier -x | 8 x Nc + 2x Nb×Nc×Nr bits | Beamforming Feedback Report for carrier -X |
| ... | ... | ... |
| Beamforming Feedback Report for carrier -1 | 8 x Nc + 2x Nb×Nc×Nr bits | Beamforming Feedback Report for carrier -1 |
| Beamforming Feedback Report for carrier 1 | 8 x Nc + 2x Nb×Nc×Nr bits | Beamforming Feedback Report for carrier 1 |
| ... | ... | ... |
| Beamforming Feedback Report for carrier x | 8 x Nc + 2x Nb×Nc×Nr bits | Beamforming Feedback Report for carrier X |

* X is 28 for 20Mhz, 56 for 40Mhz and 112 for 80Mhz for example

FIG. 10

| Field | Size | Meaning |
|---|---|---|
| SNR in space-time stream 1 | 8 bits | Signal to Noise Ratio in the STA sending the report for space-time stream 1 for carrier k |
| ... | ... | |
| SNR in space-time stream Nc | 8 bits | Signal to Noise Ratio in the STA sending the report for space-time stream Nc for carrier k |
| Beamforming Feedback Matrix V | 2× $Nb \times Nc \times Nr$ bits | Beamforming Feedback Matrix V for carrier k |

FIG. 11

| Field | Size | Meaning |
|---|---|---|
| Beamforming Feedback Report for carrier -x | $8 \times Nc + Na \times (b_\psi + b_\phi)/2$ | Beamforming Feedback Report for carrier -X |
| ... | ... | ... |
| Beamforming Feedback Report for carrier -1 | $8 \times Nc + Na \times (b_\psi + b_\phi)/2$ | Beamforming Feedback Report for carrier -1 |
| Beamforming Feedback Report for carrier 1 | $8 \times Nc + Na \times (b_\psi + b_\phi)/2$ | Beamforming Feedback Report for carrier 1 |
| ... | ... | ... |
| Beamforming Feedback Report for carrier x | $8 \times Nc + Na \times (b_\psi + b_\phi)/2$ | Beamforming Feedback Report for carrier X |

* X is 28 for 20Mhz, 56 for 40Mhz and 112 for 80Mhz for example

FIG. 13

| Field | Size | Meaning |
|---|---|---|
| SNR in space-time stream 1 | 8 bits | Signal to Noise Ratio in the STA sending the report for space-time stream 1 for carrier k |
| ... | ... | |
| SNR in space-time stream Nc | 8 bits | Signal to Noise Ratio in the STA sending the report for space-time stream Nc for carrier k |
| Beamforming Feedback Matrix V | Na x (b$_\psi$+b$_\phi$)/2 | Beamforming Feedback Matrix V for carrier k |

FIG. 14

| Size of V (Nr x Nc) | Number of angles (Na) | The order of angles in the quantized beamforming matrices feedback information field |
|---|---|---|
| 6 x 1 | 10 | $\phi 11, \phi 21, ..., \phi 51, \psi 21, \psi 31, ..., \psi 61$ |
| 6 x 2 | 18 | $\phi 11, \phi 21, ..., \phi 51, \psi 21, \psi 31, ..., \psi 61, \phi 22, \phi 32, ..., \phi 52, \psi 32, \psi 42, ..., \psi 62$ |
| 6 x 3 | 24 | $\phi 11, \phi 21, ..., \phi 51, \psi 21, \psi 31, ..., \psi 61, \phi 22, \phi 32, ..., \phi 52, \psi 32, \psi 42, ..., \psi 62, \phi 33, \phi 43, \phi 53, \psi 43, \psi 53, \psi 63$ |
| 6 x 4 | 28 | $\phi 11, \phi 21, ..., \phi 51, \psi 21, \psi 31, ..., \psi 61, \phi 22, \phi 32, ..., \phi 52, \psi 32, \psi 42, ..., \psi 62, \phi 33, \phi 43, \phi 53, \psi 43, \psi 53, \psi 63, \phi 44, \phi 54, \psi 54, \psi 64$ |
| 6 x 5 | 30 | $\phi 11, \phi 21, ..., \phi 51, \psi 21, \psi 31, ..., \psi 61, \phi 22, \phi 32, ..., \phi 52, \psi 32, \psi 42, ..., \psi 62, \phi 33, \phi 43, \phi 53, \psi 43, \psi 53, \psi 63, \phi 44, \phi 54, \psi 54, \psi 64, \phi 55, \psi 65$ |
| 6 x 6 | 30 | $\phi 11, \phi 21, ..., \phi 51, \psi 21, \psi 31, ..., \psi 61, \phi 22, \phi 32, ..., \phi 52, \psi 32, \psi 42, ..., \psi 62, \phi 33, \phi 43, \phi 53, \psi 43, \psi 53, \psi 63, \phi 44, \phi 54, \psi 54, \psi 64, \phi 55, \psi 65$ |

| Size of V (Nr x Nc) | Number of angles (Na) | The order of angles in the quantized beamforming matrices feedback information field |
|---|---|---|
| 8 x 1 | 14 | φ11, φ21, ..., φ71, ψ21, ψ31,..., ψ81 |
| 8 x 2 | 26 | φ11, φ21, ..., φ71, ψ21, ψ31,..., ψ81, φ22, φ32, ..., φ72, ψ32, ψ42,..., ψ82 |
| 8 x 3 | 36 | φ11, φ21, ..., φ71, ψ21, ψ31,..., ψ81, φ22, φ32, ..., φ72, ψ32, ψ42,..., ψ82, φ33, φ43, ..., φ73, ψ43, ψ53,..., ψ83 |
| 8 x 4 | 44 | φ11, φ21, ..., φ71, ψ21, ψ31,..., ψ81, φ22, φ32, ..., φ72, ψ32, ψ42,..., ψ82, φ33, φ43, ..., φ73, ψ43, ψ53,..., ψ83, φ44, φ54, ..., φ74, ψ54, ψ64,..., ψ84 |
| 8 x 5 | 50 | φ11, φ21, ..., φ71, ψ21, ψ31,..., ψ81, φ22, φ32, ..., φ72, ψ32, ψ42,..., ψ82, φ33, φ43, ..., φ73, ψ43, ψ53,..., ψ83, φ44, φ54, ..., φ74, ψ54, ψ64,..., ψ84, φ55, φ65, φ75, ψ65, ψ75, ψ85 |
| 8 x 6 | 54 | φ11, φ21, ..., φ71, ψ21, ψ31,..., ψ81, φ22, φ32, ..., φ72, ψ32, ψ42,..., ψ82, φ33, φ43, ..., φ73, ψ43, ψ53,..., ψ83, φ44, φ54, ..., φ74, ψ54, ψ64,..., ψ84, φ55, φ65, φ75, ψ75,ψ85, φ66, φ76, ψ76, ψ86 |
| 8 x 7 | 56 | φ11, φ21, ..., φ71, ψ21, ψ31,..., ψ81, φ22, φ32, ..., φ72, ψ32, ψ42,..., ψ82, φ33, φ43, ..., φ73, ψ43, ψ53,..., ψ83, φ44, φ54, ..., φ74, ψ54, ψ64,..., ψ84, φ55, φ65, φ75, ψ75,ψ85, φ66, φ76, ψ76, ψ86, φ77, ψ87 |
| 8 x 8 | 56 | Same as 8x7 case |

FIG. 16

METHOD AND SYSTEM FOR COMMUNICATING FEEDBACK INFORMATION IN A MULTIPLE USER MULTIPLE INPUT MULTIPLE OUTPUT (MU-MIMO) COMMUNICATION SYSTEM

CROSS-REFERENCE TO RELATED APPLICATIONS/INCORPORATION BY REFERENCE

This application makes reference to, claims priority to, and claims the benefit of U.S. Provisional Application Ser. No. 61/291,355, filed Dec. 30, 2009.

This application makes reference to:
U.S. application Ser. No. 12/190,272 filed Aug. 12, 2008; and
U.S. application Ser. No. 11/450,818 filed Jun. 9, 2006.

Each of the above stated applications is hereby incorporated herein by reference in its entirety.

FIELD OF THE INVENTION

Certain embodiments of the invention relate to communication networks. More specifically, certain embodiments of the invention relate to a method and system for communicating feedback information in a multiple user multiple input multiple output (MIMO) communication system.

BACKGROUND OF THE INVENTION

Mobile communication has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. The $3^{rd}$ Generation Partnership Project (3GPP) is a collaboration among telecommunications associations from around the world whose purpose is to develop standards for wireless networks, which meet the demands of the mobile Internet. One of the projects undertaken by the 3GPP toward this end is referred to as the 3GPP long term evolution (3GPP LTE) project. The 3GPP LTE project has a broad set of objectives relating to specifications for data transfer rates and frequency spectrum utilization in wireless communication networks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for communicating feedback information in a multiple user multiple input multiple output (MU-MIMO) communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3 is a diagram that illustrates an exemplary beamforming report frame format, in accordance with an embodiment of the invention.

FIG. 6 is a diagram that illustrates an exemplary CSI report field (with average SNR/receive antenna) in a CSI feedback report, in accordance with an embodiment of the invention.

FIG. 7 is a diagram that illustrates an exemplary CSI report field (with SNR/carrier tone/receive antenna) in a CSI feedback report, in accordance with an embodiment of the invention.

FIG. 8 is a diagram that illustrates an exemplary CSI feedback report format within an exemplary CSI report field for an exemplary individual carrier tone, in accordance with an embodiment of the invention.

FIG. 9 is a diagram that illustrates an exemplary beamforming report field (with average SNR/space-time stream) in a non-compressed beamforming feedback report, in accordance with an embodiment of the invention.

FIG. 10 is a diagram that illustrates an exemplary beamforming report field (with SNR/carrier tone/space-time stream) in a non-compressed beamforming feedback report, in accordance with an embodiment of the invention.

FIG. 11 is a diagram that illustrates an exemplary beamforming report field in a non-compressed beamforming feedback report for an exemplary individual carrier tone, in accordance with an embodiment of the invention.

FIG. 13 is a diagram that illustrates an exemplary beamforming report field (with SNR/carrier tone/space-time stream) in a compressed beamforming feedback report, in accordance with an embodiment of the invention.

FIG. 14 is a diagram that illustrates an exemplary beamforming report field in a compressed beamforming feedback report for an exemplary individual carrier tone, in accordance with an embodiment of the invention.

FIG. 15 is a diagram that illustrates an exemplary order for reporting rotation angles and/or phase shift angles in a compressed beamforming feedback report for the case $N_r=6$, in accordance with an embodiment of the invention.

FIG. 16 is a diagram that illustrates an exemplary order for reporting rotation angles and/or phase shift angles in a compressed beamforming feedback report for the case $N_r=8$, in accordance with an embodiment of the invention.

DETAILED DESCRIPTION OF THE INVENTION

Figure 1:
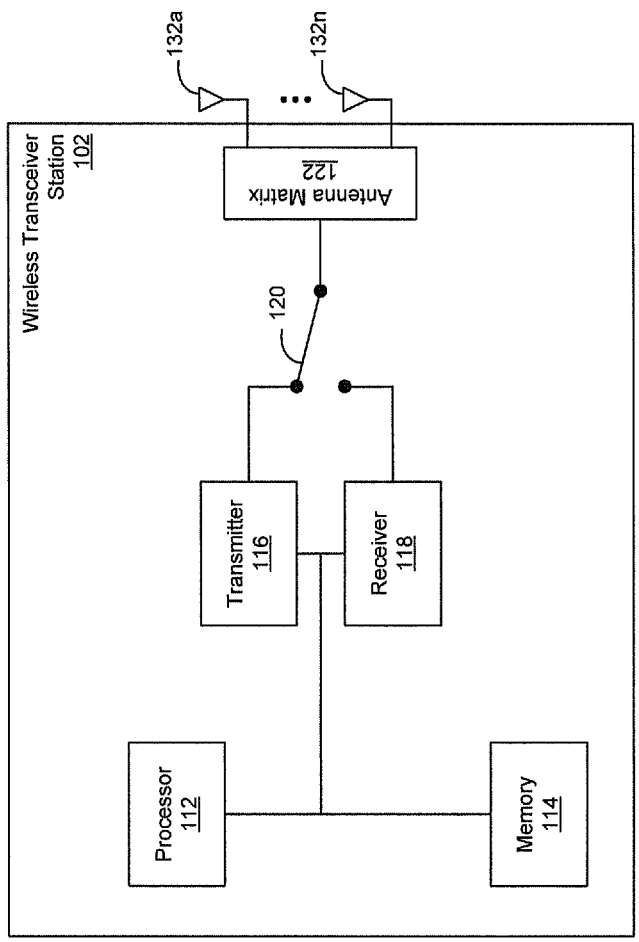
FIG. 1 is a block diagram of an exemplary MIMO transceiver, which may be utilized in connection with an embodiment of the invention.

Certain embodiments of the invention may be found in a method and system for communicating feedback information in a multiple user multiple input multiple output (MU-MIMO) communication system. In various embodiments of the invention, a transmitting station, for example a base station, may concurrently transmit signals that may be received by one or more user equipment (UE) stations. In various embodiments of the invention, the base station and/or UE may, for example, be a mobile communication device and/or a stationary, or fixed location, communication device. The signals transmitted by the base station (also referred to as a beamformer) may communicate a request for feedback information from one or more UE stations (also referred to as beamformees). A beamformee may respond by sending feedback information. In the request for feedback information, the beamformer may specify a plurality of radio frequency (RF) channel bands. The plurality of RF channel bands may be referred to as a multiband. Each of the beamformees may send feedback information for each of the channel bands in the multiband. In instances where a beamformee is not able to generated feedback information for all of the requested channel bands in the multichannel, the beamformee may send feedback information for a portion of the channel bands in the multichannel.

In an exemplary embodiment of the invention, the feedback information is sent in an action report frame, for example a beamforming report. Various embodiments of the invention comprise a specified format for the beamforming report frame. In various embodiments of the invention, the beamforming report frame may comprise various types of information. In exemplary embodiments of the invention the information types may include a channel state information (CSI) feedback report, a non-compressed beamforming feedback report and a compressed beamforming feedback report. In various embodiments of the invention, the beamformer may indicate to the beamformees the specific information type that is being requested for inclusion in the beamforming report frame. In addition, the beamformer may specify a multiband, which is to be utilized by the beamformees in connection with the beamforming report frame. Each recipient beamformee may respond by generating a beamforming report frame, which comprises a CSI feedback report, a beamforming feedback reports and/or a compressed beamforming feedback report. The information contained with the report sent by the beamformee may be organized by channel band. For example, a CSI feedback report send by a beamformee may comprise CSI feedback data for each channel band within the multiband.

The beamformer may utilize information contained within a CSI feedback report and/or beamforming feedback report to compute and/or generate a beamforming matrix, which may be utilized to enable the generation of subsequent concurrently transmitted signals. In an exemplary embodiment of the invention, the beamformer may utilize 8 transmitting antennas for transmission of the subsequent concurrently transmitted signals.

FIG. 1 is a block diagram of an exemplary MIMO transceiver, which may be utilized in connection with an embodiment of the invention. Referring to FIG. 1, there is shown a wireless transceiver station 102 and a plurality of antennas 132a ... 132n. The exemplary wireless transceiver station 102 comprises a processor 112, a memory 114, a transmitter 116, a receiver 118, a transmit and receive (T/R) switch 120 and an antenna matrix 122.

The wireless transceiver station 102 may comprise suitable logic, circuitry, interfaces and/or code that may be operable to .... The wireless transceiver station 102 is an exemplary wireless communication device, which may be utilized at a base station or at a UE in a wireless communication system. In an exemplary 3GPP wireless communication system, the base station may be referred to as a node B. In an exemplary MU-MIMO communication system, the base station may be referred to as an access point (AP). The UE may be referred to as a station (STA). An AP and/or STA may be utilized in wireless local area network (WLAN) systems. An exemplary specification for WLAN systems may be found in IEEE draft Standard 802.11n, Draft 11 (hereinafter referred to as "Draft11").

The processor 112 may comprise suitable logic, circuitry, interfaces and/or code that may be operable to perform functions, operations and/or methods described herein. The memory 114 may comprise suitable logic, circuitry, interfaces and/or code that may be operable to perform functions, operations and/or methods described herein.

The plurality of antennas 132a ... 132n may enable the wireless transceiver station 102 to transmit and/or receive signals, for example radio frequency (RF) signals, via a wireless communication medium. The wireless transceiver station 102 shown in FIG. 1 may also be depicted as comprising one or more transmitting antennas, which are coupled to the transmitter 116 and one or more receiving antennas, which may be coupled to the receiver 118 without loss of generality.

The antenna matrix 122 may enable selection of one or more of the antennas 132a ... 132n for transmitting and/or receiving signals at the wireless transceiver station 102. The T/R switch 120 may enable the antenna matrix 122 to be communicatively coupled to the transmitter 116 or receiver 118. When the T/R switch 120 enables communicative coupling between the transmitter 116 and the antenna matrix 122, the selected antennas 132a ... 132n may be utilized for transmitting signals. When the T/R switch 120 enables communicative coupling between the receiver 118 and the antenna matrix 122, the selected antennas 132a ... 132n may be utilized for receiving signals.

The transmitter 116 may comprise suitable logic, circuitry, interfaces and/or code that may be operable to enable the generation of signals, which may be transmitted via the selected antennas 132a ... 132n. The transmitter 116 may generate signals by performing coding functions, signal modulation and/or signal modulation. In various embodiments of the invention, the transmitter 116 may enable generation of signals using precoding and/or beamforming techniques.

The receiver 118 may comprise suitable logic, circuitry, interfaces and/or code that may be operable to enable the processing of signals received via the selected antennas 132a ... 132n. The receiver 118 may generate data based on the received signals by performing signal amplification, signal demodulation and/or decoding functions. In various embodiments of the invention, the receiver 118 may enable generation of data, which may be utilized by the transmitter 116 for precoding and/or beamforming of generated signals.

The processor 112 may enable the generation of transmitted data and/or the processing of received data. The processor 112 may generate data, which is utilized by the transmitter 116 to generate signals. The processor 112 may process data generated by the receiver 118. In various embodiments of the invention in a node B, the processor 112 may process data received by the receiver 118 and generate coefficient data, which may be utilized by the transmitter 116 for precoding and/or beamforming of generated signals. The coefficient data may be stored in the memory 114.

In various embodiments of the invention, in a UE station, the processor 112 may be operable to process data received by the receiver to generate beamforming data and/or channel state information (CSI). The beamforming data and/or CSI may be stored in the memory 114. The beamforming data and/or CSI may be sent to the transmitter 116 by the processor 112 or the beamforming data and/or CSI may be retrieved from the memory 114 by the transmitter 116. The transmitter 116 may utilize the beamforming data and/or CSI to generate signals, which are transmitted via the transmitting antennas 132a . . . 132n.

Figure 2:
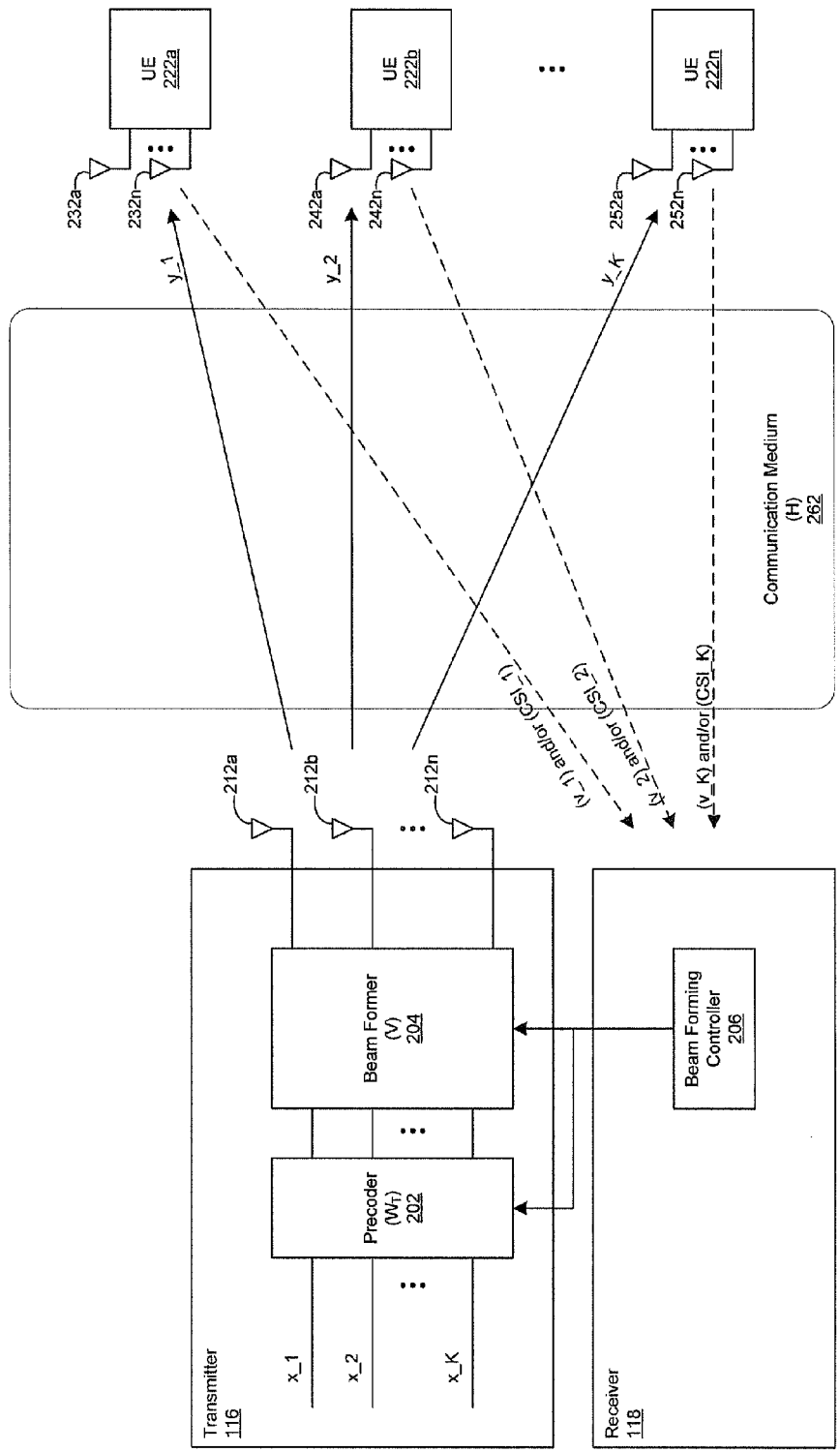
FIG. 2 is a block diagram of an exemplary multiple user MIMO system, which may be utilized in connection with an embodiment of the invention.

FIG. 2 is a block diagram of an exemplary multiple user MIMO system, which may be utilized in connection with an embodiment of the invention. Referring to FIG. 2, there is shown a transmitter 116 (from FIG. 1) with a plurality of transmitting antennas 212a, 212b, . . . , 212n, a receiver 118 (from FIG. 1), a UE station 222a with a plurality of antennas 232a . . . 232n, a UE station 222b with a plurality of antennas 242a . . . 242n, a UE station 222n with a plurality of antennas 252a . . . 252n, and a communication medium 262. The number of UE stations 222a, 222b, . . . , 222n may be represented by the quantity K. The antennas 242a . . . 242n, 242a . . . 242n and/or 252a . . . 252n may be utilized for transmission and/or reception of signals at UE 222a, 222b and 222n, respectively. The number of antennas at each UE may be represented by the quantity $M_R$. However, in various embodiments of the invention, the number of antennas at any given UE may be independently determined. The transmitter 116 may comprise a precoder 202 and a beamformer 204. The receiver 118 may comprise a beamforming controller 206. In various embodiments of the invention, the transmitter 116 and receiver 118 may be components within a node B. The number of transmitting antennas 212a, 212b, . . . , 212n may be represented by the quantity $M_T$.

In various embodiments of the invention the node B may concurrently transmit data streams $x_1, x_2, \ldots, x_K$ to a plurality of K UE stations such that the $i^{th}$ UE is the intended recipient of data stream $x_i$. Each of the data streams may represent $M_S$ spatial streams or space-time streams. In an exemplary embodiment of the invention, $M_S=1$ and each data stream represents a single data stream or space-time stream. The precoder 202 may generate precoded data streams by precoding the transmit data streams $x_1, x_2, \ldots, x_K$ based on a transmitter precoding matrix $W_T$. The beamformer 204 may receive the precoded data streams and generate a plurality of $M_T$ transmitted signals based on a beamforming matrix V. Each of the $M_T$ transmitted signals may be transmitted by a distinct one of the transmitting antennas 212a, 212b, . . . , 212n. The transmitted signals may propagate across the communication medium 262. The amplitude and/or phase of the transmitted signals may be modified as they propagate across the communication medium 262. The signal modification of propagating signals is referred to as fading. The signal fading characteristics of the communication medium 262 may be represented by a channel estimated matrix H. The signals received at UE 222a may be referred to as signal $y_1$, the signals received at UE 222b may be referred to as signal $y_2$ and the signals received at UE 222n may be referred to as signal $y_K$.

The UE 222a may utilize an interference cancellation filter to process the received signal $y_1$ and thereby enable the detection of a received signal $r_1$. The received signal $r_1$ may represent an estimated value for the transmitted data stream $x_1$. The characteristics of the interference cancellation filter utilized at the UE 222a may be represented by the matrix $w_{R1}$. An interference cancellation filter may also be referred to as a "matched filter". The UE 222b may utilize an interference cancellation filter to process the received signal $y_2$ and thereby enable the detection of a received signal $r_2$. The received signal $r_2$ may represent an estimated value for the transmitted data stream $x_2$. The characteristics of the interference cancellation filter utilized at the UE 222b may be represented by the matrix $w_{R2}$. The UE 222n may utilize an interference cancellation filter to process the received signal $y_K$ and thereby enable the detection of a received signal $r_K$. The received signal $r_K$ may represent an estimated value for the transmitted data stream $x_K$. The characteristics of the interference cancellation filter utilized at the UE 222b may be represented by the matrix $w_{RK}$.

Based on the received signal $y_1$, the UE 222a may communicate feedback information to the receiver 118. For example, the received signal $y_1$ may enable the reception of protocol data units (PDUs) from the transmitter 116. Each PDU may comprise a preamble field, which enables the UE 222a to generate a beamforming matrix and/or CSI based on the received signal $y_1$. The node B may communicate PDUs to the UEs, which comprise a request for feedback information. The PDU may indicate the type of feedback information that is being requested by the node B. For example, the node B may request that the feedback information comprise a CSI report, a non-compressed beamforming feedback report or compressed beamforming feedback report. The beamforming matrix generated by the UE 222a, which may be compressed or non-compressed, may be represented as a matrix $v_1$, and the CSI may be represented as $CSI_1$. In addition, the beamforming matrix may comprise one or more channel quality indicator (CQI) values. Exemplary CQI data comprise signal to noise ratio (SNR) values. The beamforming matrix and/or CSI may be communicated to the receiver 118 as feedback information ($v_1$) and/or ($CSI_1$) via the communication medium 262. The beamforming feedback matrix, $v_1$, may comprise beamforming data and/or CQI data, which may be organized by channel band within a multiband. For each channel band, the beamforming data and/or CQI data may be organized by tone, for each of the tones within the channel bandwidth. The feedback information, $CSI_1$, may comprise channel estimate data, which is organized by channel band within a multiband. For each channel band, the channel estimate data may be organized by tone, for each of the tones within the channel bandwidth.

The feedback information ($v_1$) and/or (CSI) may be communicated within frames (or generally PDUs), which comprise preamble data. The preamble data may enable the node B to compute a user channel matrix, $H_1$, which characterizes the communication medium 262 for signals transmitted by the UE 222a and received at the receiver 118. Similarly, the UE 222b and UE 222n may communicate feedback information, ($v_2$) and/or ($CSI_2$) and ($v_K$) and/or ($CSI_K$) respectively, to the receiver 118 via the communication medium 262. Reception of the feedback information in PDUs, which comprise ($v_2$) and/or ($CSI_2$) and in PDUs, which comprise ($v_K$) and/or ($CSI_K$) may enable the node B to compute user channel matrices, $H_2$ and $H_K$, which characterizes the communication medium 262 for signals transmitted by the UE 222b and UE 222n, respectively, and received at the receiver 118.

The beamforming controller 206 may receive feedback information ($v_i$) and/or ($CSI_i$) from one or more UE stations. The beamforming controller 206 may enable the generation of precoding and/or beamforming coefficients, which may be utilized by the precoder 202 and/or beamformer 204 in connection with the precoding matrix $W_T$ and/or the beamforming matrix, V.

The depiction of FIG. 2 may also be practiced in connection with MU-MIMO systems in which the transmitter 116 and receiver 118 are components within an AP.

Various embodiments of the invention comprise a method and system for communicating feedback information in a MU-MIMO communication system. In an exemplary embodiment of the invention, a beamformer, for example a base station or an AP, may send a feedback information request to a plurality of beamformees, for example UE stations 222a, 222b, . . . , and 222n. The feedback information request may be sent via a sounding frame. The sounding frame may indicate the type of feedback information that the beamformer is requesting from the beamformees. In an exemplary embodiment of the invention, the requested information types comprise a CSI feedback report, a non-compressed beamforming feedback report and a compressed beamforming feedback report. In addition, the sounding frame may comprise a multiband specification. The multiband indication may indicate a plurality of RF channels bands and/or an RF channel bandwidth for each of the RF channel bands specified in the multiband. In an exemplary embodiment of the invention, the requested feedback information may be specified within the CSI/Steering field of the HT control field for the sounding frame transmitted by the beamformer.

Each of the beamformees that receive the feedback information request may respond by sending a beamforming report frame. An exemplary beamforming report frame format is presented in FIG. 3. The beamforming report frame may comprise information in accordance with the requested information type that was requested by the beamformer in the feedback information request. Data in the beamforming report frame may be provided for one or more RF channel bands in the multiband that was specified in the feedback information request. For example, if the beamformee is capable of providing feedback information for all of the RF channel bands in the multiband, the beamforming report frame from that beamforee may comprise feedback data for each of the RF bands in the multiband. In other instances, if the beamformee is capable of providing feedback information for a portion of the RF channel bands in the multiband, the beamforming report frame from that beamformee may comprise feedback data for that portion of the RF bands in the multiband.

In various embodiments of the invention, the beamformer may generate a plurality of Nc signals that are sequentially transmitted to a plurality of beamformees. Each of the transmitted signals may utilize a distinct one of a plurality of Nc channel bands. In an exemplary embodiment of the invention, a current signal may be transmitted utilizing a current channel band within the multiband, wherein a subsequent signal may be transmitted utilizing a subsequent channel band within the multiband. The plurality of signals may be generated based on data from a plurality of space-time streams. In an exemplary embodiment of the invention, the beamformer may generate a plurality of Nc space-time streams.

Each beamformee may receive the sequentially transmitted signals. Based on the concurrently transmitted signals, each beamformee may generate data for one or more of the plurality of Nc channel bands requested in a feedback information request from the beamformer. Each beamformee may send the requested data in a beamforming report frame to the beamformer. Each beamformee may utilize a beamforming report frame as presented in FIG. 3.

In various embodiments of the invention, the beamformer may concurrently transmit at least a portion of the generated plurality of Nc signals. A given beamformee may concurrently receive at least a portion of the concurrently transmitted signals.

FIG. 3 is a diagram that illustrates an exemplary beamforming report frame format, in accordance with an embodiment of the invention. Referring to FIG. 3, there is shown a beamforming report frame format 300. In an exemplary embodiment of the invention, the beamforming report frame is an action frame. The beamforming report frame format comprises beamforming reports for a plurality of channel bands (Nc). In an exemplary embodiment of the invention, the number of channel bands may correspond to the number of transmit data stream groups at a beamformer. For example, in a MU-MIMO system, the number of transmit data stream groups may correspond to the number of beamformee stations. Referring to FIG. 2, in an exemplary embodiment of the invention, Nc=K. For example, given a multiband that comprises a plurality of K RF channel bands, an AP may concurrently transmit a plurality of signals to a plurality of K user devices where each one of the plurality of signals is transmitted via a distinct RF channel band, which is selected from the plurality of K RF channel bands in the multiband. Each distinct RF channel band may be associated with a distinct one of the plurality of K user devices. Each of the transmitted signals may comprise data that was generated based on a plurality of L(i) data streams, where the variable "i" is an index that identifies each of the user devices among the plurality of K user devices and L(i) indicates the plurality of individual data streams that are associated with the data stream group for the $i^{th}$ user device.

The beamforming report fields, within the beamforming report frame format, may comprise different types of feedback information. These feedback information types may include a CSI feedback report, a non-compressed beamforming report and a compressed beamforming report. Referring to the beamforming report frame format 300, in item 3, there is a cluster/channel control field. The cluster/channel control field, which is presented in FIG. 4, indicates which RF bands in the multiband are present in the beamforming report frame. Following the cluster/channel control field, beginning with item 4, there is a MIMO control field for the first channel band in the multiband, followed in item 5 by a beamforming report for the first channel band. The MIMO control field format is presented in FIG. 5. Following item 5, the beamforming report frame format 300 includes a pair of items, comprising a MIMO control field and a beamforming report, for each subsequent channel band that is present in the beamforming report frame as is specified in the cluster/channel control field. The contents of the beamforming report are dependant upon the information type contained therein. The beamforming report for the CSI feedback information type is presented in FIG. 6. The beamforming report for the non-compressed beamforming information type is presented in FIG. 9. The beamforming report for the compressed beamforming information type is presented in FIG. 12.

In various embodiments of the invention, the beamforming report frame may be sent by a beamformee in response to a sounding frame sent by a beamformer. The sounding frame may comprise a request for feedback information from the beamformees. The sounding frame may indicate the type of information that is being requested by the beamformer. In an exemplary embodiment of the invention, the indication is contained within the CSI/Steering field of the HT Control field in the transmitted sounding frame. The beamforming report frame format shown in FIG. 3 may enable the reporting of feedback information for each channel band (or multichannel) requested by the beamformee. In various embodiments of the invention, a multichannel may comprise a plurality of frequencies within a channel band and is identified by the center frequency of that channel band.

Figure 4:
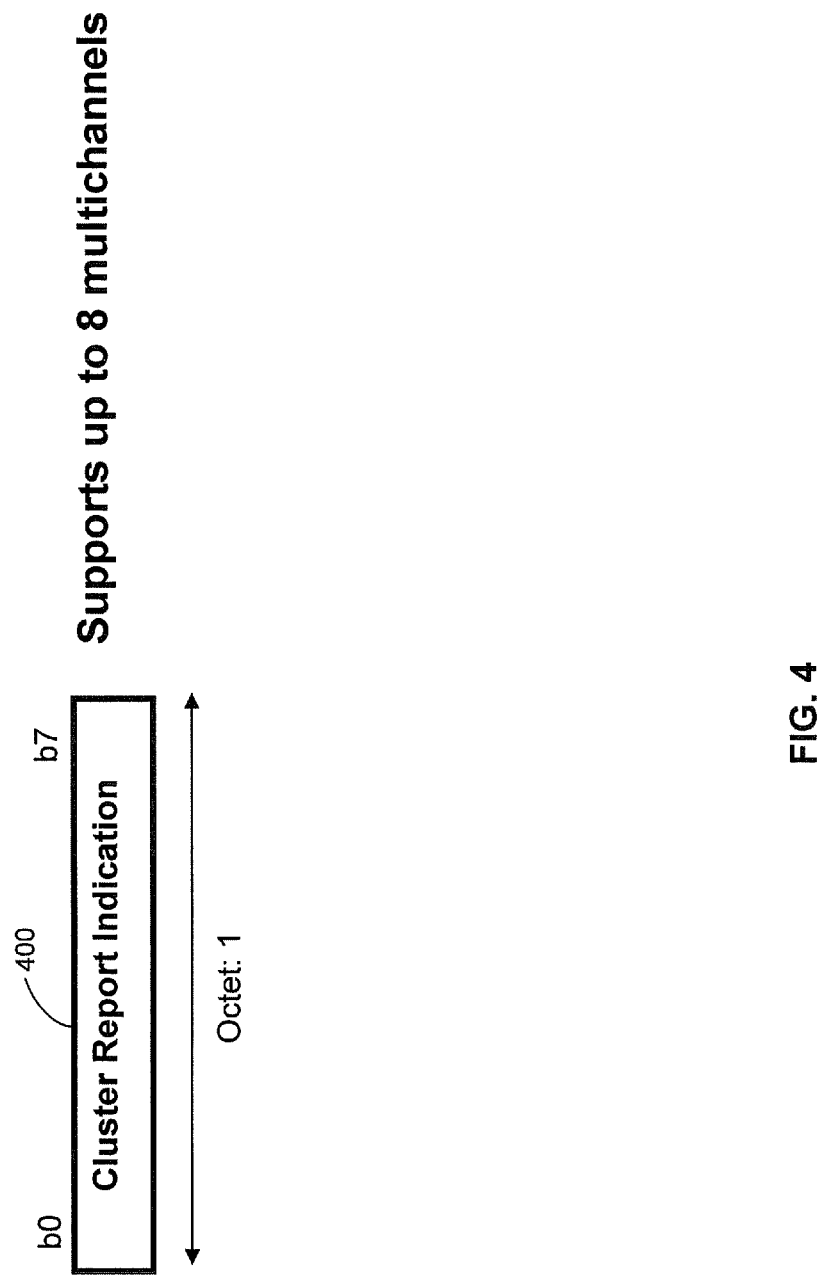
FIG. 4 is a diagram that illustrates an exemplary cluster control field, in accordance with an embodiment of the invention.

FIG. 4 is a diagram that illustrates an exemplary cluster control field, in accordance with an embodiment of the invention. The cluster control field 400 shown in FIG. 4 refers to the cluster/channel control field indicated in FIG. 3. The cluster control field indicates the channel numbers within the specified multiband that are present in a given feedback report transmitted to the beamformer by a beamformee. In an exemplary embodiment of the invention, the AP (beamformer) may send a sounding request, which indicates one or more RF channel bands in a multiband. The UE (beamformee) or station (STA) receiving the sounding request may then generate a beamforming report which comprises feedback information for one or more of the requested channel bands. The STA may indicate the channel bands that are contained within the generated feedback information in the cluster control field as indicated in FIG. 4.

In an exemplary embodiment of the invention as shown in FIG. 4, up to 8 RF channel bands may be indicated, although various embodiments of the invention are not so limited. In the exemplary cluster control field shown in FIG. 4, each bit corresponds to a channel band, where increasing bit positions in the cluster control field (from bit position b0 to bit position b7) indicate ascending RF channel frequency bands. The number of nonzero bits in the cluster control field corresponds to the value for the number of channel bands, Nc.

Figure 5:
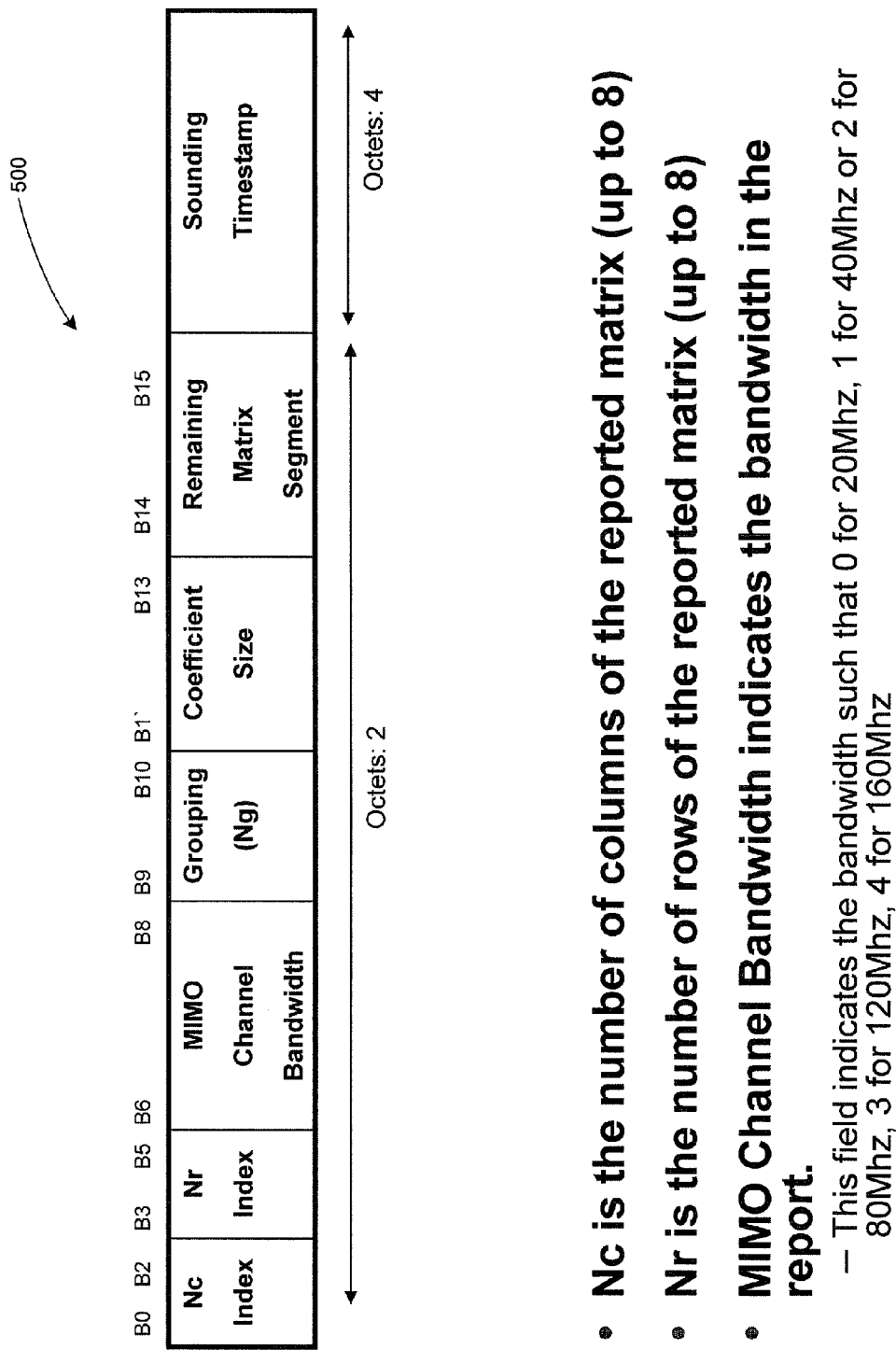
FIG. 5 is a diagram that illustrates an exemplary MIMO control field, in accordance with an embodiment of the invention.

FIG. 5 is a diagram that illustrates an exemplary MIMO control field, in accordance with an embodiment of the invention. The MIMO control field 500 shown in FIG. 5 refers to the MIMO control fields indicated in FIG. 3 for each of the plurality of Nc channel bands. The MIMO control field for an $i^{th}$ channel band comprises information that pertains to the beamforming report for the $i^{th}$ channel band.

In various embodiments of the invention, the Nc field within the MIMO control field comprises an index which indicates the number of columns in the beamforming report. The Nr field within the MIMO control field comprises an index which indicates the number of rows in the beamforming report. The MIMO Channel Bandwidth field in the MIMO control field comprises an index which indicates the bandwidth of the reported channel band. In an exemplary embodiment of the invention, the MIMO Channel Bandwidth field is a 3 bit field wherein a value of 0 indicates 20 MHz, 1 indicates 40 MHz, 2 indicates 80 MHz, 3 indicates 120 MHz and 4 indicates 160 MHz. The Coefficient Size field within the MIMO control field indicates the resolution for quantization of the feedback information generated in connection with the given channel band. In various embodiments of the invention, the coefficient size field may correspond to a number of bits to be utilized for quantization. In an exemplary embodiment of the invention, the Coefficient Size field may comprise 3 bits, which support a specification of up to 8 distinct levels of resolution for quantization.

FIG. 6 is a diagram that illustrates an exemplary CSI report field (with average SNR/receive antenna) in a CSI feedback report, in accordance with an embodiment of the invention. The CSI report field is one of the feedback information types, which may be contained within the beamforming report frame format presented in FIG. 3. Accordingly, the CSI report field 600 shown in FIG. 6 refers to the beamforming report for the $i^{th}$ channel band fields, as indicated in FIG. 3, for each of the plurality of Nc channel bands. In FIG. 6, an average SNR value is reported for each receive chain at a beamformee. The average SNR value may be computed by averaging SNR values across all carrier tones received at a receive chain. In an exemplary embodiment of the invention, the number of receive chains is equal to Nr, which corresponds to the number of receive antennas.

In addition, in FIG. 6, a CSI matrix is reported for each carrier tone (where a tone corresponds to a frequency) in the channel bandwidth for the $i^{th}$ channel band. In an exemplary embodiment of the invention, the range of carrier tone frequency index values in a channel band, ranging from $-x$ to $-1$ and from 1 to x, is determined by the channel bandwidth. For example, a 20 MHz channel bandwidth, x=28, for a 40 MHz channel bandwidth, x=56 and for an 80 MHz channel bandwidth, x=112. Each CSI matrix is generated based on a channel estimate matrix (H) that is computed at the beamformee in response to received signals. The channel estimate matrix may comprise a plurality of channel estimate values, each of which is quantized based on a plurality of Nb quantization bits. In various embodiments of the invention, the beamformee may compute a CSI matrix for each carrier tone, for each receive chain and for each requested channel band. Accordingly, the number of bits contained in each CSI matrix for each carrier tone shown in FIG. 6 may be dependent upon the number of quantization bits, Nb, the number of requested and/or reported channel bands, Nc, and the number of receive chains, Nr.

FIG. 7 is a diagram that illustrates an exemplary CSI report field (with SNR/carrier tone/receive antenna) in a CSI feedback report, in accordance with an embodiment of the invention. Comparing FIG. 7 to FIG. 6, in FIG. 7, an SNR value may be reported for each individual carrier tone for each receive chain. Referring to FIG. 7, the CSI report field 700 comprises a CSI Feedback Report field for each carrier in the channel bandwidth for the $i^{th}$ channel band. Each CSI Feedback Report field comprises SNR data and CSI data for a distinct tone in the channel bandwidth.

FIG. 8 is a diagram that illustrates an exemplary CSI feedback report format within an exemplary CSI report field for an exemplary individual carrier tone, in accordance with an embodiment of the invention. The CSI feedback report format 800 shown in FIG. 8 presents further detail of the contents of each of the CSI Feedback Report fields shown in FIG. 7. The CSI feedback report formation 800 comprises, for each carrier tone in the channel bandwidth for the $i^{th}$ channel band, an SNR value for each receive chain at the beamformee and a CSI matrix. The CSI Feedback Matrix field shown in FIG. 8 comprises information as shown in the CSI Matrix fields indicated in FIG. 6.

FIG. 9 is a diagram that illustrates an exemplary beamforming report field (with average SNR/space-time stream) in a non-compressed beamforming feedback report, in accordance with an embodiment of the invention. Referring to FIG. 9, there is shown a non-compressed beamforming report field 900. The non-compressed beamforming report field 900 is one of the feedback information types, which may be contained within the beamforming report frame format presented in FIG. 3. Accordingly, the non-compressed beamforming report field 900 shown in FIG. 9 refers to the beamforming report for the $i^{th}$ channel band fields indicated in FIG. 3 for each of the plurality of Nc channel bands. In the non-compressed beamforming report field 900, the beamformee may report an average SNR value for each of a plurality of space-time stream signals received from the beamformer. The average SNR value may be computed by averaging SNR values across a plurality of carrier tones in the $i^{th}$ channel band for each received space-time stream signal. In an exemplary embodiment of the invention, a beamformee may receive a plurality of Nc space-time stream signals from the beamformer. For purposes of the present application, the terms "spatial stream" and "space-time stream" may be utilized interchangeably.

In the non-compressed beamforming report field 900, a beamforming feedback matrix is reported for each carrier tone in the channel bandwidth of the $i^{th}$ channel band. In an exemplary embodiment of the invention, the range of carrier tone frequency index values in a channel band, ranging from −x to −1 and from 1 to x, is determined by the channel bandwidth. For example, a 20 MHz channel bandwidth, x=28, for a 40 MHz channel bandwidth, x=56 and for an 80 MHz channel bandwidth, x=112. Each beamforming feedback matrix is generated based on a beamforming matrix (V) that is computed at the beamformee in response to received signals. The beamforming matrix may comprise a plurality of beamforming weighting values, each of which is quantized based on a plurality of Nb quantization bits. In various embodiments of the invention, for each carrier tone, the beamformee may compute a beamforming matrix for each receive chain and for each space-time stream. Accordingly, as shown in FIG. 9, for each carrier tone, the number of bits contained in each beamforming feedback matrix may be dependent upon the number of quantization bits, Nb, the number of space-time streams, Nc, and the number of receive chains, Nr.

FIG. 10 is a diagram that illustrates an exemplary beamforming report field (with SNR/carrier tone/space-time stream) in a non-compressed beamforming feedback report, in accordance with an embodiment of the invention. Referring to FIG. 10, there is shown a non-compressed beamforming report 1000. Comparing the beamforming report 1000 to the beamforming report 900, in the beamforming report 1000, an SNR value may be reported for each individual carrier tone for each space-time stream as is shown in FIG. 11.

FIG. 11 is a diagram that illustrates an exemplary beamforming report field in a non-compressed beamforming feedback report for an exemplary individual carrier tone, in accordance with an embodiment of the invention. Referring to FIG. 11, there is shown a non-compressed beamforming feedback report field 1100. The non-compressed feedback report field 1100 refers to each of the Beamforming Feedback Report for carrier −X fields shown in FIG. 10. In the non-compressed beamforming feedback report field 1100, for each carrier tone, an SNR value is reported for each space-time stream in addition to the beamforming feedback matrix for that carrier tone. The Beamforming Feedback Matrix V field shown in FIG. 11 comprises information as shown in the Beamforming Feedback Matrix V fields presented in FIG. 9.

Various embodiments of the invention may utilize methods to reduce the amount of feedback information overhead in communications between the beamformee and the beamformer. An exemplary embodiment of the invention may utilize Givens rotation to reduce feedback information overhead. Each of the beamforming matrices V, which are generated by a beamformee, may be represented in a decomposition form based on a product of Givens rotation matrices and a diagonal phase shift matrix. The decomposition may result in the computation of a plurality of Givens rotation angles $\psi$ and/or phase shift angles $\phi$. The total number of Givens rotation angels and/or phase shift angles may be represented by Na. The feedback information communicated by the beamformee may comprise the Givens rotation angles and/or phase shift angles computed for each beamforming matrix V. In an exemplary embodiment of the invention, the Givens rotation angles and phase shift angles may be quantized and selected from a codebook. Each reported Givens rotation angle may be represented by a plurality of $b_\psi$ bits while each reported phase shift angle is represented by a plurality of $b_\phi$ bits.

Figure 12:
FIG. 12 is a diagram that illustrates an exemplary beamforming report field (with average SNR/space-time stream) in a compressed beamforming feedback report, in accordance with an embodiment of the invention.

FIG. 12 is a diagram that illustrates an exemplary beamforming report field (with average SNR/space-time stream) in a compressed beamforming feedback report, in accordance with an embodiment of the invention. Referring to FIG. 12, there is shown a compressed beamforming feedback report field 1200. The compressed beamforming feedback report field 1200 is one of the feedback information types, which may be contained within the beamforming report frame format presented in FIG. 3. Accordingly, the compressed beamforming report field 1200 shown in FIG. 12 refers to the beamforming report for the $i^{th}$ channel band fields indicated in FIG. 3 for each of the plurality of Nc channel bands. In the compressed beamforming report field 1200, the beamformee may report an average SNR value for each of a plurality of space-time stream signals received from the beamformer. The average SNR value may be computed by averaging SNR values across a plurality of carrier tones in the $i^{th}$ channel band for each received space-time stream signal.

In the compressed beamforming report field 1200, a beamforming feedback matrix is reported for each carrier tone in the channel bandwidth for the $i^{th}$ channel band. In an exemplary embodiment of the invention, the range of carrier tone frequency index values in a channel band, ranging from −x to −1 and from 1 to x, is determined by the channel bandwidth. For example, a 20 MHz channel bandwidth, x=28, for a 40 MHz channel bandwidth, x=56 and for an 80 MHz channel bandwidth, x=112. Each beamforming feedback matrix is generated based on a beamforming matrix (V) that is computed at the beamformee in response to received signals. In an exemplary embodiment of the invention, each beamforming feedback matrix V may comprise a plurality of Givens rotation angles (each quantized based on a plurality of $b_\psi$ quantization bits) and a plurality of phase rotation angles (each quantized based on a plurality of $b_\phi$ quantization bits). In an exemplary embodiment of the invention, the dimensions for each beamforming matrix V are Nr rows and Nc columns (Nr×Nc).

In various embodiments of the invention, the beamformee may compute a beamforming feedback matrix V for each carrier tone. Accordingly, the number of bits contained in each beamforming feedback matrix for each carrier tone may be dependent upon the number of reported angles, Na, the number of quantization bits/Givens rotation angle, $b_\psi$ and the number of quantization bits/phase rotation angle, $b_\phi$. In an exemplary embodiment of the invention, the number of bits contained in each beamforming feedback matrix for each carrier tone is equal to $Na \times (b_\psi + b_\phi)/2$.

FIG. 13 is a diagram that illustrates an exemplary beamforming report field (with SNR/carrier tone/space-time stream) in a compressed beamforming feedback report, in accordance with an embodiment of the invention. Referring to FIG. 13, there is shown a compressed beamforming feedback report 1300. Comparing the compressed beamforming report 1300 to the compressed beamforming report 1200, in the compressed beamforming report 1300, an SNR value may be reported for each individual carrier tone for each space-time stream as shown in FIG. 14.

FIG. 14 is a diagram that illustrates an exemplary beamforming report field in a compressed beamforming feedback report for an exemplary individual carrier tone, in accordance with an embodiment of the invention. Referring to FIG. 14, there is shown a compressed beamforming feedback report field 1400. The compressed feedback report field 1400 refers to each of the Beamforming Feedback Report for carrier –X fields shown in FIG. 13. In the compressed beamforming feedback report field 1400, for each carrier tone, an SNR value is reported for each space-time stream in addition to the beamforming feedback matrix for that carrier tone. The Beamforming Feedback Matrix V field shown in FIG. 14 comprises information as shown in the Beamforming Feedback Matrix V fields presented FIG. 12.

FIG. 15 is a diagram that illustrates an exemplary order for reporting rotation angles and/or phase shift angles in a compressed beamforming feedback report for the case $N_r=6$, in accordance with an embodiment of the invention. FIG. 15 shows the number of angles, Na, that are reported for varying numbers of space-time streams, Nc, when the number of receiving antennas is equal to 6. In addition, for each combination of Nr and Nc, an order for reporting phase rotation angles, $\phi_{ab}$, (where index values "a" and "b" indicate specific phase rotation angles), and Givens rotation angles, $\psi_{ij}$ (where index values "i" and "j" indicate specific Givens rotation angles), is specified.

Various embodiments of the invention enable additional quantization values (relative to Draft11) for $b_\psi$ and $b_\phi$, where $b_\psi$ refers to the number of quantization bits for the rotation angle and $b_\phi$ refers to the number of quantization bits for the phase rotation angle. Based on these additional quantization values, additional quantization values of $(b_\psi+b_\phi)/2=\{5,6,7,8\}$ may be supported.

FIG. 16 is a diagram that illustrates an exemplary order for reporting rotation angles and/or phase shift angles in a compressed beamforming feedback report for the case $N_r=8$, in accordance with an embodiment of the invention. FIG. 16 shows the number of angles, Na, that are reported for varying numbers of space-time streams, Nc, when the number of receiving antennas is equal to 8. In addition, for each combination of Nr and Nc, an order for reporting phase rotation angles, $\phi_{ab}$, and Givens rotation angles, $\psi_{ij}$, is specified.

Figure 17:
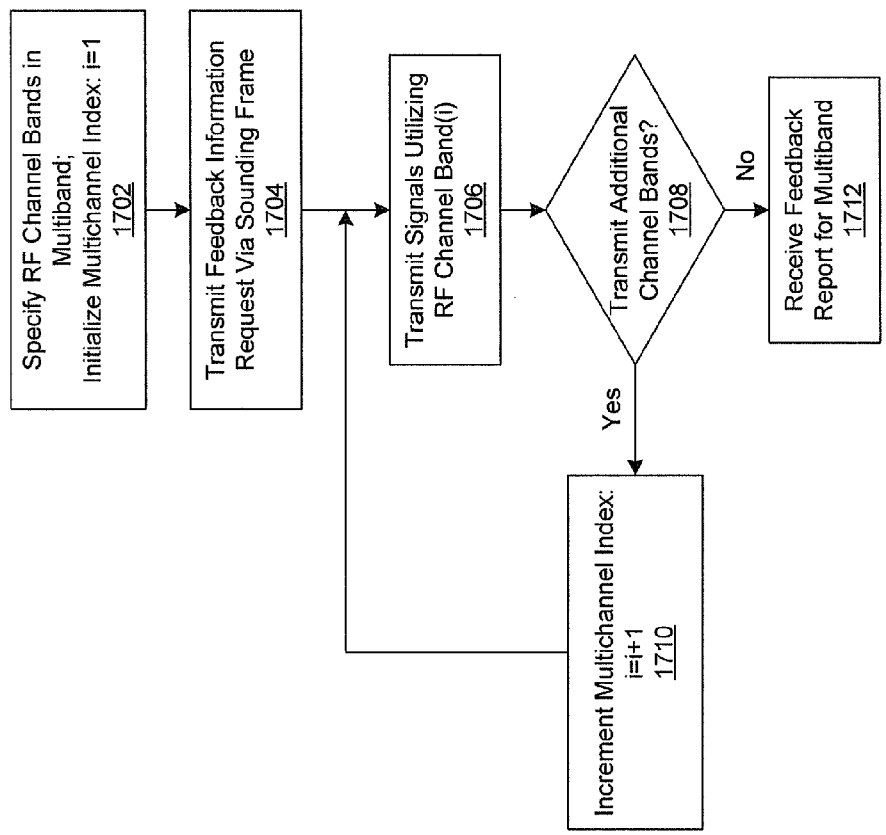
FIG. 17 is a flowchart that illustrates exemplary beamformer steps for communicating feedback information in a MU-MIMO communication system, in accordance with an embodiment of the invention.

FIG. 17 is a flowchart that illustrates exemplary beamformer steps for communicating feedback information in a MU-MIMO communication system, in accordance with an embodiment of the invention. Referring to FIG. 17, in step 1702, the beamformer may determine a plurality of RF channel bands that form a specified multiband. The beamformer may also initialize a multichannel index, i=1. The multichannel index value may be utilized to refer to individual RF channel bands in the multichannel. In step 1704, the beamformer may transmit a sounding frame to a plurality of beamformees. The sounding frame may comprise a feedback information request. The feedback information request specifies the type of feedback information that is requested and/or the RF channel bands within the multiband.

In step 1706, the beamformer may transmit one or more signals utilizing RF channel band i. In step 1708, the beamformer may determine whether there are remaining channel bands to be transmitted. In instances where the multiband comprises a plurality of Nc channel bands, this determination may be made based on the comparison i<Nc. In step 1708, in instances where there are additional channel bands to be transmitted, in step 1710, the beamformer may increment the multichannel index. Step 1706 may follow step 1710. In step 1708, in instances where there are no additional channel bands to be transmitted, the beamformer may await the reception of beamforming reports from the beamformees at step 1712.

Figure 18:
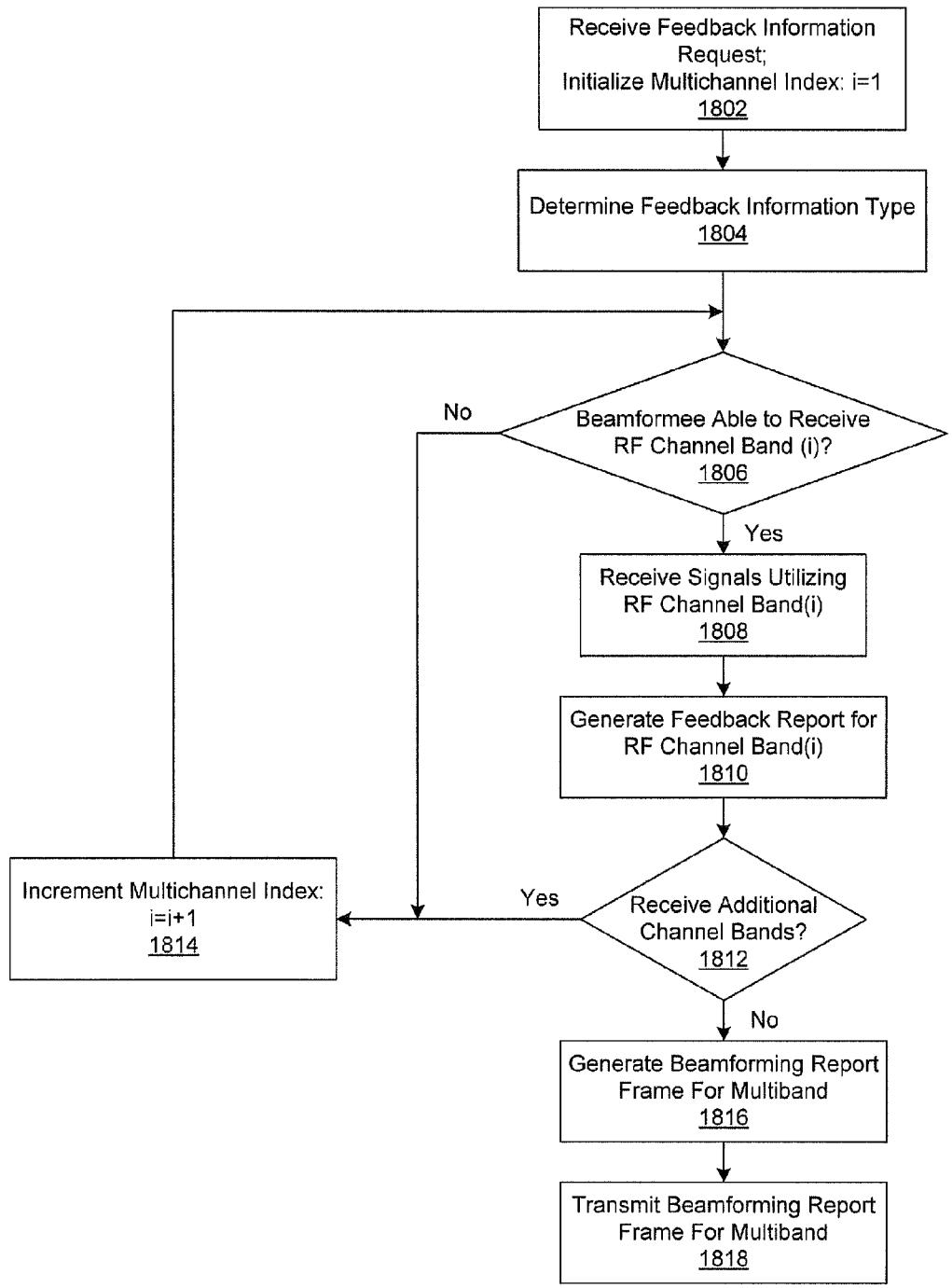
FIG. 18 is a flowchart that illustrates exemplary beamformee steps for communicating feedback information in a MU-MIMO communication system, in accordance with an embodiment of the invention.

FIG. 18 is a flowchart that illustrates exemplary beamformee steps for communicating feedback information in a MU-MIMO communication system, in accordance with an embodiment of the invention. In step 1802, the beamformee may receive a feedback information request from a beamformer. The beamformee may also initialize a multichannel index, i=1. The multichannel index value may be utilized to refer to individual RF channel bands in the multichannel. In step 1804, the beamformee may determine a feedback information type based on the received feedback information request. In step 1806, the beamformee may determine whether it is able to receive signals utilizing RF channel band(i). In step 1806, in instances where the beamformee is not able to receive signals utilizing RF channel band(i), in step 1814, the beamformee may increment the multichannel index. Step 1806 may follow step 1814.

In step 1806, in instances where the beamformee is able to receive signals utilizing RF channel band(i), in step 1808, the beamformee may receive signals utilizing RF channel band (i). In step 1810, the beamformee may generate a feedback data for RF channel band(i). In various embodiments of the invention, the feedback data may comprise a multichannel CSI feedback report for the $i^{th}$ RF channel band, a multichannel non-compressed beamforming report for the $i^{th}$ RF channel band and/or a multichannel compressed beamforming report for the $i^{th}$ RF channel band. The generated feedback data may comprise averaged SNR information per receive chain, averaged SNR information per received space-time stream signal, SNR information per tone per receive chain and/or SNR information per tone per received space-time stream signal based on information contained within the feedback information request.

In step 1812, the beamformee may determine whether there are additional RF channel bands to be received. In instances where the multiband comprises a plurality of Nc channel bands, this determination may be made based on the comparison i<Nc. In step 1812, in instances where there is additional RF channel bands to be received, step 1814 may follow step 1812 and the beamformee may receive signals from the next RF channel band in the multichannel. In step 1812, in instances where there are no additional RF channel bands to be received, in step 1816, the beamformee may generate a beamforming report frame for the multiband. The beamforming report frame may comprise feedback data for one or more RF channel bands in the multichannel. The beamforming report frame may comprise an indication of the RF channel bands for which feedback data has been generated. In step 1818, the beamformee may transmit the beamforming report frame to the beamformer.

Various embodiments of a method and system for communicating feedback information in a MU-MIMO communication system may be practiced in connection with one or more beamformees (such as one or more of UE devices 222a, 222b, . . . , 222n). A beamformee may generate a multiband feedback report that comprises feedback data for a plurality of RF channel bands, as shown in FIG. 3. Each of the RF channel bands may comprise a plurality of frequency tones in a corresponding channel bandwidth. The maximum number of RF channel bands is equal to 8, as shown in FIG. 4. The beamformee may transmit the multiband feedback report to a beamformer (such as a base station, node B or AP). The beamformee may generate the multiband feedback report in response to a feedback information request from the beamformer. The feedback information request may be received via a sounding frame, such as that described in the Draft11 specification.

The beamformee may generate distinct single channel feedback data for each of the plurality of RF channel bands. The single channel feedback data may comprise a beamforming report field for the $i^{th}$ channel band as shown in FIG. 3. The distinct single channel feedback data may comprise channel state information feedback data (as shown in FIG. 6), non-compressed beamforming data (as shown in FIG. 9) and compressed beamforming data (as shown in FIG. 12). The contents of the distinct single channel feedback data may be determined based on the received feedback information request.

The multiband feedback report comprises a multiband control field as shown in FIG. 4. The multiband control field may indicate each of the plurality of RF channel bands that are present in the multiband feedback report. A channel bandwidth for an $i^{th}$ RF channel band is indicated in the MIMO control field for the $i^{th}$ channel band as shown in FIG. 5. The MIMO control field may indicate a coefficient size parameter wherein the coefficient size parameter comprises 3 bits as shown in the Coefficient Size field in FIG. 3.

Another embodiment of the invention may provide a computer readable medium, having stored thereon, a computer program having at least one code section executable by a computer, thereby causing the computer to perform the steps as described herein for communicating feedback information in a multiple user multiple input multiple output (MU-MIMO) communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   in a user equipment (UE) device:
      generating a multiband feedback report, said multiband feedback report comprising feedback data for a plurality of radio frequency (RF) channel bands, wherein each of said plurality of RF channel bands comprises a plurality of frequency tones within a corresponding channel bandwidth and said multiband feedback report comprises a multiband control field;
      identifying, in said multiband control field, each of said plurality of RF channel bands;
      indicating, in said multiband feedback report, a coefficient size parameter for said each of said plurality of RF channel bands, wherein said coefficient size parameter comprises 3 bits; and
      transmitting said multiband feedback report.

2. The method according to claim 1, comprising generating said multiband feedback report in response to a feedback information request.

3. The method according to claim 2, comprising receiving said feedback information request via a sounding frame.

4. The method according to claim 1, comprising generating distinct single channel feedback data for each of said plurality of RF channel bands.

5. The method according to claim 4, wherein said distinct single channel feedback data comprises one or more of channel state information feedback data, non-compressed beamforming data and compressed beamforming data, based on a received feedback information request.

6. The method according to claim 1, wherein:
   the method is performed within a wireless communication device.

7. The method according to claim 1, further comprising:
   receiving a first signal from a remotely located wireless communication device; and
   transmitting a second signal, that includes the multiband feedback report, to the remotely located wireless communication device.

8. The method according to claim 7, comprising indicating, in said multiband feedback report, a channel bandwidth for said each of said plurality of RF channel bands.

9. The method according to claim 1, wherein:
   the method is performed within a wireless communication device that includes a plurality of antennae to support multiple-input-multiple-output (MIMO) or multi-user multiple-input-multiple-output (MU-MIMO) communications.

10. The method according to claim 1, wherein a maximum number of said plurality of RF channel bands is equal to 8.

11. A system for processing signals, the system comprising:
   one or more circuits that enable generation of a multiband feedback report, said multiband feedback report comprising feedback data for a plurality of radio frequency (RF) channel bands, wherein each of said plurality of RF channel bands comprises a plurality of frequency tones within a corresponding channel bandwidth and said multiband feedback report comprises a multiband control field; and
   wherein said one or more circuits enable identification, in said multiband control field, of each of said plurality of RF channel bands;
   wherein said one or more circuits enable indication, in said multiband feedback report, of a coefficient size parameter for said each of said plurality of RF channel bands, wherein said coefficient size parameter comprises 3 bits; and
   said one or more circuits enable transmission of said multiband feedback report.

12. The system according to claim 11, wherein said one or more circuits enable generation of said multiband feedback report in response to a feedback information request.

13. The system according to claim 12, wherein said one or more circuits enable reception of said feedback information request via a sounding frame.

14. The system according to claim 11, wherein said one or more circuits enable generation of distinct single channel feedback data for each of said plurality of RF channel bands.

15. The system according to claim 14, wherein said distinct single channel feedback data comprises one or more of channel state information feedback data, non-compressed beamforming data and compressed beamforming data, based on a received feedback information request.

16. The system according to claim 11, wherein:
the system includes a wireless communication device.

17. The system according to claim 11, further comprising:
at least one communication interface to receive a first signal from a remotely located wireless communication device; and wherein:
the at least one communication interface to transmit a second signal, that includes the multiband feedback report, to the remotely located wireless communication device.

18. The system according to claim 17, wherein said one or more circuits enable indication, in said multiband feedback report, of a channel bandwidth for said each of said plurality of RF channel bands.

19. The system according to claim 11, wherein:
the system includes a wireless communication device that includes a plurality of antennae to support multiple-input-multiple-output (MIMO) or multi-user multiple-input-multiple-output (MU-MIMO) communications.

20. The system according to claim 11, wherein a maximum number of said plurality of RF channel bands is equal to 8.

* * * * *